I. L. THOMPSON.
Apparatus for Cleaning Boilers of Mud.

No. 220,445. Patented Oct. 7, 1879.

WITNESSES: N. C. Campbell
Charles W. Roberts

INVENTOR
Isaac L. Thompson
per Lewis & Bichel ATTORNEYS

UNITED STATES PATENT OFFICE.

ISAAC L. THOMPSON, OF ALLEGHENY, PENNSYLVANIA.

IMPROVEMENT IN APPARATUS FOR CLEANING BOILERS OF MUD.

Specification forming part of Letters Patent No. 220,445, dated October 7, 1879; application filed February 24, 1879.

*To all whom it may concern:*

Be it known that I, ISAAC L. THOMPSON, of Allegheny, in the county of Allegheny and State of Pennsylvania, have made certain new Improvements in Apparatuses for Cleaning Boilers of Mud and Scales; and I do hereby declare that the following is a full, clear, and exact description of the invention, which will enable others skilled in the art to which it appertains to make and use the same, reference being had to the accompanying drawings, and to the letters of reference marked thereon, which form a part of this specification, and in which—

Figure 1:
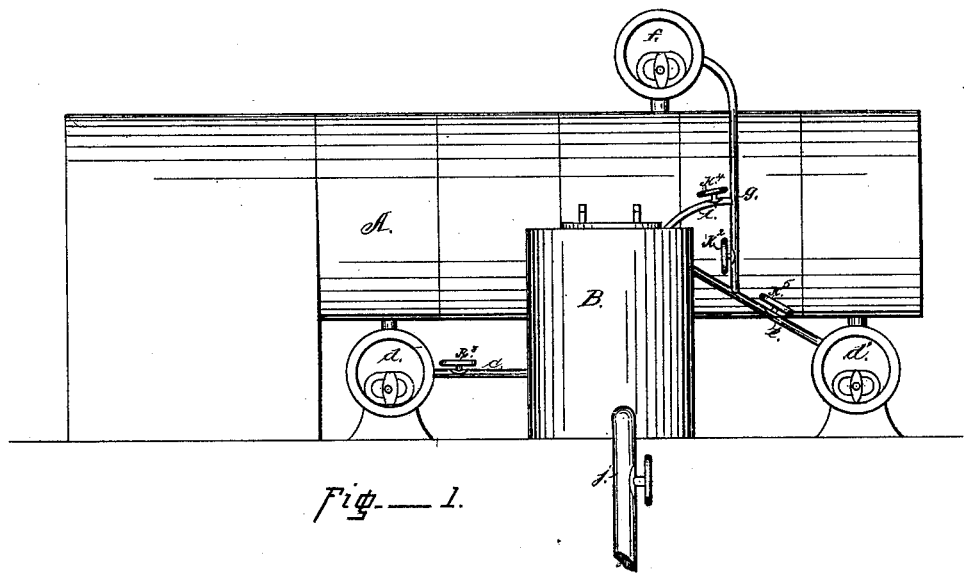
Figure 2:
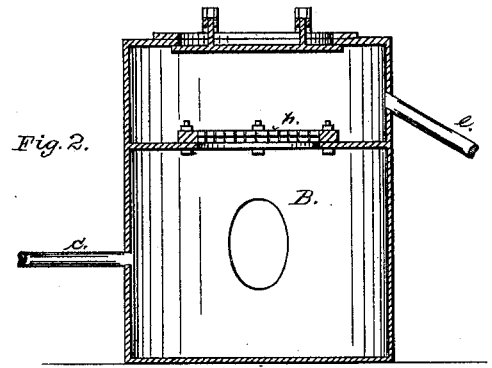
Figure 3:
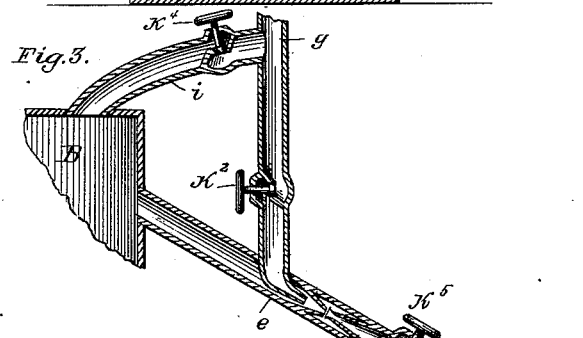

Figure 1 represents a side elevation of my improved apparatus for cleaning boilers of mud and scales; Fig. 2, a cross-section of the filter or vat. Fig. 3 is a sectional view of the connection of the steam-pipe and injector.

Similar letters of reference indicate corresponding parts in the figures.

The object of my invention is to construct a contrivance by means of which boilers may be cleaned of mud and scales, and consists in placing a filter or vat containing a strainer between the forward mud-drum and after mud-drum, or in any convenient position near the boilers, and connecting said filter with the forward mud-drum by means of a pipe passing in the filter below the strainer. The water, with the mud and scales, is drawn through this pipe into the filter by means of an injector or siphon or a force-pump, operated by steam passing from the steam-drum attached to the top of the boilers through a pipe into the injector or siphon, said injector or siphon being connected to the filter above the strainer, passing either in the after mud-drum or directly into the boiler, the mud and scales remaining at the bottom of the filter, from whence they can be ejected by means of the blow-off pipe attached to the lower portion of the filter. The clarified water, rising above the strainer, passes in the boiler, as above described, thereby keeping up a continuous circulation.

In the drawings, A represents the boiler; B, the filter or vat; c, the pipe connecting the forward mud-drum with the filter; d, the forward mud-drum; d', the after mud-drum; e, the injector or siphon, connected with the after mud-drum, d', and the steam-pipe g, and entering the vat above the strainer; f, the steam-drum, attached to the top of the boiler; g, the steam-pipe connecting with the injector or siphon, and operating the same; h, the strainer; i, the branch steam-pipe; j, the blow-off pipe, attached to the lower portion of the filter; $k^2$ $k^3$ $k^4$ $k^5$, the stop-cocks attached to the various pipes.

From the foregoing description the nature of my invention and its advantages will be readily understood.

The operation consists in opening the valves $k^2$ and $k^5$ of the steam-pipe g, operating the injector or siphon e, and also the valve $k^3$, attached to the pipe c, thereby drawing the water from the boiler into the filter, and from thence through the injector back again into the after mud-drum, or directly into the boiler, either way insuring a successful operation of my invention.

In ejecting the mud and scales collected at the bottom of the filter, it is necessary to open the valve $k^2$ of the steam-pipe, also valve $k^4$ of the branch steam-pipe, and to close valve $k^3$ of the pipe connecting the forward mud-drum with the filter, and also the valve $k^5$, attached to the injector or siphon. By this operation the pressure of the steam passing through the branch steam-pipe i forces the mud and scales through the blow-off pipe and out of the filter.

Having thus described my invention, I claim and desire to secure by Letters Patent of the United States—

1. The steam-pipe g, having the branch pipe i, in combination with the injector e, the mud-drum d', and the vat B, having the strainer h, connecting-pipe c, and the mud-drum d, as and for the purpose set forth.

2. The steam-pipe g, provided with the cock $k^2$ and the branch pipe i, which bears the cock $k^4$, in combination with the injector e, having the cock $k^5$, the mud-drum d', and the vat B, substantially as shown, and for the purpose set forth.

3. The steam-pipe g, provided with the cock $k^2$ and the branch pipe i, which bears the cock $k^4$, in combination with the injector e, which is provided with the cock $k^5$, the mud-drum d', the vat B, having the strainer h, the connecting-pipe c, having the cock $k^3$, the mud-drum d, and the discharge-pipe j, which bears its appropriate cock, operating substantially as described.

ISAAC L. THOMPSON.

Witnesses:
CHAS. BICKET,
CHARLES M. ROBERTS.